US008842233B2

(12) United States Patent
Oura

(10) Patent No.: US 8,842,233 B2
(45) Date of Patent: Sep. 23, 2014

(54) LIQUID CRYSTAL MODULE

(75) Inventor: Hisaharu Oura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 69 days.

(21) Appl. No.: 13/449,809

(22) Filed: Apr. 18, 2012

(65) Prior Publication Data

US 2012/0287371 A1 Nov. 15, 2012

(30) Foreign Application Priority Data

May 10, 2011 (JP) ................................ 2011-105620

(51) Int. Cl.
G02F 1/1333 (2006.01)
G02F 1/1335 (2006.01)

(52) U.S. Cl.
USPC .............................................. 349/58; 349/65

(58) Field of Classification Search
USPC ....................................... 349/58, 65
See application file for complete search history.

(56) References Cited

U.S. PATENT DOCUMENTS

| 6,992,736 B2* | 1/2006 | Saito et al. ........................ 349/58 |
| 2003/0164903 A1* | 9/2003 | Saito et al. ........................ 349/58 |
| 2004/0120161 A1* | 6/2004 | Hwang .......................... 362/558 |
| 2005/0001952 A1* | 1/2005 | Han et al. ........................ 349/65 |
| 2007/0115691 A1* | 5/2007 | Yu .................................. 362/632 |
| 2007/0263407 A1* | 11/2007 | Sakai ............................ 362/608 |
| 2008/0297687 A1 | 12/2008 | Watanabe |

FOREIGN PATENT DOCUMENTS

| JP | 2003-107467 A | 4/2003 |
| JP | 2008-97877 A | 4/2008 |
| JP | 4489423 B2 | 4/2010 |
| JP | 2010-135297 A | 6/2010 |
| JP | 2010-251027 A | 11/2010 |

OTHER PUBLICATIONS

European Search Report of corresponding EP Application No. 12 16 7405.5 dated Sep. 26, 2012.

* cited by examiner

Primary Examiner — Dennis Y Kim
(74) Attorney, Agent, or Firm — Global IP Counselors, LLP

(57) ABSTRACT

A liquid crystal module includes a rear frame, a light guide plate, and a light source unit. The light guide plate is disposed in an interior of the rear frame. The light guide plate has a plurality of protruding components on a first end face of the light guide plate. The protruding components are spaced apart from each other and having distal end faces. The light source unit is disposed along the first end face of the light guide plate. The light source unit has a wiring board and a plurality of light source elements that is disposed on the wiring board. The distal end faces of the protruding components abuts the wiring board of the light source unit, respectively, such that the first end face of the light guide plate and each of the light source elements defines a spacing therebetween.

14 Claims, 3 Drawing Sheets

LIQUID CRYSTAL MODULE

CROSS-REFERENCE TO RELATED APPLICATIONS

This application claims priority to Japanese Patent Application No. 2011-105020 filed on May 10, 2011. The entire disclosure of Japanese Patent Application No. 2011-105620 is hereby incorporated herein by reference.

BACKGROUND

1. Field of the Invention

The present invention generally relates to a liquid crystal nodule. More specifically, the present invention relates to a liquid crystal module having a light guide plate.

2. Background Information

With a typical conventional edge-lit liquid crystal module, a light guide plate is provided inside a rear frame. An LED bar having LEDs arranged in a row on a wiring board is attached along one end face of the light guide plate so as to maintain a clearance between the LEDs and the one end face of the light guide plate. A liquid crystal panel is disposed on a front face side of the light guide plate with an optical sheet in between.

With this liquid crystal module, concave components are formed on both sides of the light guide plate. Positioning-use bent tabs formed on the rear frame are fitted into the concave components of the light guide plate, which positions the light guide plate in the up and down direction and in the left and right direction.

Meanwhile, with a conventional edge-lit backlight device, four corners of a light guide plate are supported by four support members to position the light guide plate, and LEDs are provided along both end faces of the light guide plate (see Japanese Laid-Open Patent Application Publication No. 2010-251027, for example). With a conventional edge-lit planar illumination device, both sides of a light guide plate are supported by concave members to position the light guide plate, and LEDs are provided along the end faces on both sides of the light guide plate (see Japanese Laid-Open Patent Application Publication No, 2010-135297, for example). With a conventional edge-lit backlight, the distal end of an LED housing having a U-shaped cross section abuts one end face of a light guide plate so that the spacing between the LEDs and the one end face of the light guide plate is kept constant (see Japanese Patent No. 4489423, for example). With a conventional edge-lit planar illumination device, an incident prism is formed on a side end face of a light guide plate, and a transparent spacer with an elastic layer and a non-elastic layer is interposed between the LEDs and the incident prism of the light guide plate (see Japanese Laid-Open Patent Application Publication No. 2008-97877, for example).

SUMMARY

However, with the conventional liquid crystal module, a gap is provided between the concave components of the light guide plate and the positioning-use bent tabs of the rear frame for the purpose of absorbing thermal expansion and contraction caused by heat generated by the LEDs. Thus, the light guide plate moves within the range of this gap, which creates variance in the clearance between the LEDs of the LED bar and the one end face of the light guide plate. Accordingly, if the clearance exceeds the design value, there is a risk that there will be a decrease in the efficiency at which light is incident on the light guide plate from the LEDs, less light will be emitted from the front face of the light guide plate, and the brightness of the liquid crystal panel display face will decrease.

Also, with the conventional backlight device and the conventional planar illumination device (see Japanese Laid-Open Patent Application Publication Nos. 2010-251027 and 2010-135297, for example), a gap must be provided between the light guide plate and the support members, or between the light guide plate and the concave members, in order to absorb the thermal expansion and contraction of the light guide plate. Thus, the same problem as above is encountered.

In contrast, with the conventional backlight and planar illumination device (see Japanese Patent No. 4489423 and Japanese Laid-Open Patent Application Publication No. 2008-97877, for example), the clearance between the LEDs and the end face of the light guide plate can be kept substantially constant. However, the conventional backlight requires an LED housing having a U-shaped cross section, and the conventional planar illumination device requires a transparent spacer with an elastic layer and a non-elastic layer. Thus, more parts and assembly steps are required, which drives up the cost.

An improved liquid crystal module was conceived in light of the above-mentioned problem. One object of the present disclosure is to provide a liquid crystal module with which variance is reduced in a spacing between an end face of a light guide plate and a light source elements.

In accordance with one aspect of the present disclosure, a liquid crystal module includes a rear frame, a light guide plate, and a light source unit. The light guide plate is disposed in an interior of the rear frame. The light guide plate has a plurality of protruding components on a first end face of the light guide plate. The protruding components are spaced apart from each other in a first direction of the light guide plate and having distal end faces. The light source unit is disposed along the first end face of the light guide plate. The light source unit has a wiring board and a plurality of light source elements that is disposed on the wiring board. The distal end faces of the protruding components abuts the wiring board of the light source unit, respectively, such that the first end face of the light guide plate and each of the light source elements defines a spacing therebetween.

These and other objects, features, aspects and advantages will become apparent to those skilled in the art from the following detailed description, which, taken in conjunction with the annexed drawings, discloses a preferred embodiment.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

Referring to FIGS. 1 to 5, a liquid crystal module will now be described in detail.

Figure 1:
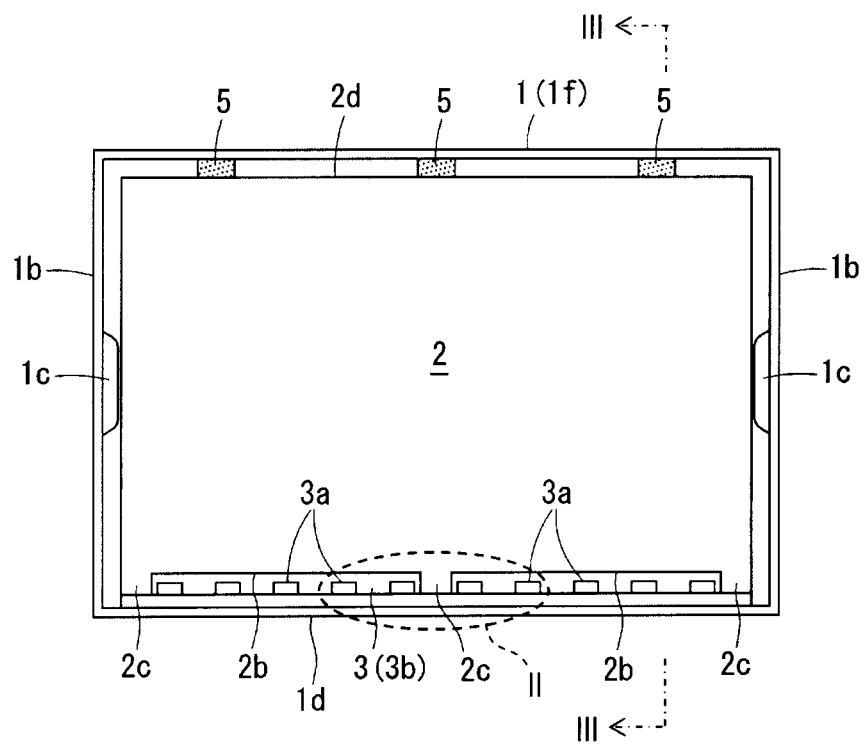
FIG. 1 is a front elevational view of a liquid crystal module in accordance with one embodiment.
Figure 2:
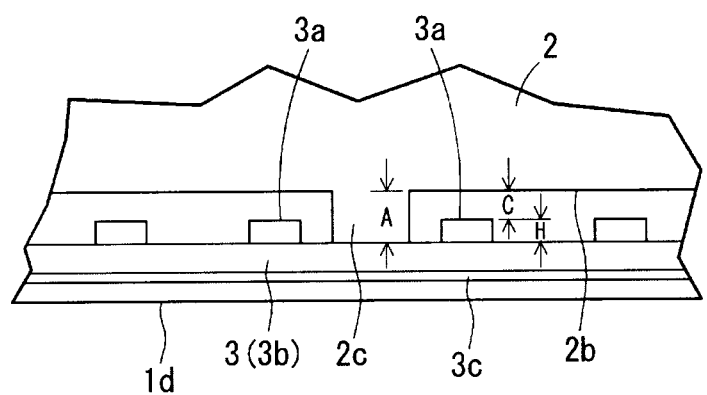
FIG. 2 is a detailed front elevational view of an encircled part II of the liquid crystal module illustrated in FIG. 1.
Figure 3:
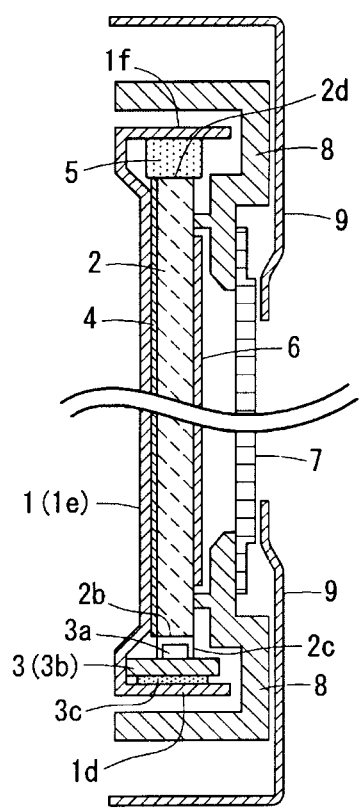
FIG. 3 is a cross sectional view of the liquid crystal module illustrated in FIG. 1, taken along III-III line in FIG. 1.

FIG. 1 is a front elevational view of the liquid crystal module. FIG. 2 is a detailed front elevational view of an encircled part II of the liquid crystal module. FIG. 3 is a cross sectional view of the liquid crystal module. As shown in FIGS. 1 and 3, the liquid crystal module basically has a rear frame 1, a light guide plate 2, and an LED bar 3 (e.g., light source unit). Furthermore, the liquid crystal module preferably has a light reflecting sheet 4, a plurality of (three in FIG. 1) cushioning materials 5 (cushioning members), a plurality of optical sheets 6, a liquid crystal panel 7, a molding frame 8 (e.g., molded frame), a bezel 9, and so forth. The liquid crystal module is an edge-lit type liquid crystal module. The rear frame 1 has a shallow box-shape. The rear frame 1 is made of sheet metal. The light guide plate 2 has a rectangular shape. The light guide plate 2 is made of a transparent synthetic resin. The light guide plate 2 is housed in an interior of this rear frame 1.

As shown in FIG. 1, left and right side plates 1b of the rear frame 1 are provided with drawn components 1c that protrude inward and are used to position the light guide plate 2 in the left and right direction (e.g., first direction) of the liquid crystal module. A gap for absorbing thermal expansion and contraction of the light guide plate 2 in the left and right direction is provided between left and right end faces of the light guide plate 2 and these drawn components 1c.

As shown in FIGS. 1 and 2, the LED bar 3 has a plurality of (ten in FIG. 1) LEDs (Light-emitting diodes) 3a (e.g., light source elements) and a rectangular wiring board 3b that is electrically coupled to the LEDs 3a. The LEDs 3a serve as a light source. The LEDs 3a are disposed on the wiring board 3b and arranged in a row along the wiring board 3b. The wiring board 3b is disposed along a lower end face 2b (e.g., first end face or one end face) of the light guide plate 2 so as to maintain a clearance (e.g., spacing) C between the LEDs 3a and the lower end face 2b of the light guide plate 2. As shown in FIGS. 2 and 3, the wiring board 3b of the LED bar 3 is adhesively fixed to an inner face of a lower side plate 1d of the rear frame 1 with a heat radiating sheet 3c interposed in between. The wiring board 3b of the LED bar 3 is a circuit board with good thermal conductivity and which has an aluminum core. Heat generated by the LEDs 3a is conducted by the wiring board 3b and the heat radiating sheet 3c, and released from the lower side plate 1d and a rear plate 1e of the rear frame 1.

As shown in FIG. 3, the light reflecting sheet 4 is provided between the light guide plate 2 and the rear plate 1e of the rear frame 1. Thus, nearly all of the light incident from the LEDs 3a of the LED bar 3 onto the light guide plate 2 is refracted and reflected, and shines out of the front face of the light guide plate 2 with none of it being wasted. A light reflective paint layer can be formed on the rear face of the light guide plate 2 instead of providing the light reflecting sheet 4. Thus, the light reflecting sheet 4 is optionally provided.

As shown in FIG. 1, the light guide plate 2 further includes a plurality of (three in FIG. 1) protruding components 2c on the lower end face 2b of the light guide plate 2. The protruding components 2c have a square shape with an equal protrusion height A (e.g., equal height) relative to the lower end face 2b of the light guide plate 2. In other words, the protruding components 2c have the equal protrusion height A measured between the lower end face 2b of the light guide plate 2 and distal end faces (e.g., lower end faces) of the protruding components 2c, respectively, in a direction of the light guide plate that is perpendicular to the left and right direction. The protruding components 2c are integrally molded with the light guide plate 2. Thus, the light guide plate 2 is integrally formed as a one-piece, unitary member. The protruding components 2c are spaced apart from each other in the left and right direction. In other words, the protruding components 2c are equidistantly arranged along the lower end face 2b of the light guide plate 2. Distal end faces (e.g., lower end faces) of the protruding components 2c abut the wiring board 3b of the LED bar 3, respectively, such that the lower end face 2b of the light guide plate 2 and each of the LEDs 3b defines the clearance C therebetween. As shown in FIG. 2, a spacing between the lower end face 2b of the light guide plate 2 and an upper surface of the wiring board 3b of the LED bar 3 is precisely maintained at the protrusion height A of the protruding components 2c. Thus, the clearance C between the LEDs 3a and the lower end face 2b of the light guide plate 2 is precisely maintained at the design value, obtained by subtracting the height H of the LEDs 3a from the protrusion height A of the protruding components 2c. Specifically, each of the clearance C has an equal dimension measured in a direction perpendicular to the left and right direction. In this embodiment, the protruding components 2c are formed at three places (both ends and the center of the lower end face 2b in the left and right direction). However, it should go without saying that the number of protruding components 2c can be two, or can be four or more. Moreover, as shown in FIG. 1, the protruding components 2c define recesses extending in the left and right direction. Moreover, each of the recesses is defined by each of pairs of adjacent protruding components 2c. More specifically, one group of the LEDs 3a is disposed within one of the recesses (e.g., left recess) defined between a left protruding component 2c and a center protruding component 2c, and the other group of the LEDs 3a is disposed within the other of the recesses (e.g., right recess) defined between the center protruding component and a right protruding component 2c. Furthermore, the center protruding component 2c abuts the wiring board 3b of the LED bar 3 at a location between a pair of adjacent LEDs 3a of the LEDs 3a.

As shown in FIGS. 1 and 3, the cushioning materials 5 are attached in a compressed state as a biasing means for biasing the light guide plate 2 toward the LED bar 3. The cushioning materials 5 are disposed between an upper end face 2d (e.g., second end face or the other end face) of the light guide plate 2 and an inner face of an upper side plate 1f (e.g., side wall) of the rear frame 1. The upper end face 2d is opposite the lower end face 2b. Therefore, the light guide plate 2 is biased toward the LED bar 3 by the elastic recovery force of the cushioning materials 5. More specifically, the cushioning materials 5 biases the upper end face 2d of the light guide plate 2 toward the LED bar 3 relative to the upper side plate 1f. The distal end faces (e.g., lower end faces) of the protruding components 2c are pressed against the wiring board 3b of the LED bar 3, respectively. Thus, the distal end faces of the protruding components 2c will not move away from the wiring board 3b even if subjected to vibration, etc. Therefore, the clearance C between the LEDs 3a and the light guide plate lower end face 2b can be precisely maintained at the design value, obtained by subtracting the height H of the LEDs 3a from the protrusion height A of the protruding components 2c. The cushioning materials 5 are made of elastic material, such as rubber or elastic resin.

There can be only two, or four or more of the cushioning materials 5 serving as the biasing means, or this can be omitted entirely. Specifically, the distal end faces of the protruding components 2c molded integrally with the lower end face 2b of the light guide plate 2 are always abutted with the wiring board 3b of the LED bar 3 under the weight of the light guide plate 2, even if there are no cushioning materials 5. Thus, the cushioning materials 5 are not necessarily required. However, it is preferable to use the cushioning materials 5 because if the liquid crystal module is subjected to vibration, or if it is moved horizontally, the distal end faces of the protruding components 2c can be reliably maintained in a state of being pressed against the wiring board 3b of the LED bar 3.

As shown in FIG. 3, the optical sheets 6 have a plurality of light scattering sheets, prism sheets, or other such optical sheets. The optical sheets 6 are laid over the front face of the light guide plate 2. The liquid crystal panel 7 is also disposed on this front face side. In other words, the liquid crystal panel 7 is disposed forward of the liquid crystal module relative to the light guide plate 2, and the optical sheets 6 are disposed between the light guide plate 2 and the liquid crystal panel 7. This liquid crystal panel 7 is supported by the inner peripheral edges of the molding frame 8. The molding frame 8 is made of a synthetic resin and attached to the four peripheral edges of the rear frame 1 around the rear frame 1. The four sides of the rear frame 1 and the liquid crystal panel 7 are surrounded by the bezel 9. Although not shown in the drawings, an X-board is connected to the end of the liquid crystal panel 7 via a chip-on-film carrying a source driver IC chip, and a Y-board is connected via a chip-on-film carrying a gate driver IC chip.

With the liquid crystal module, the distal end faces (e.g., lower end faces) of the plurality of protruding components 2c molded integrally with the lower end face 2b of the light guide plate 2 are abutted with the wiring board 3b of the LED bar 3. As a result, the clearance C between the LEDs 3a and the lower end face 2b of the light guide plate 2 can be precisely maintained at the design value, obtained by subtracting the height H of the LEDs 3a from the protrusion height A of the protruding components 2c. Thus, there will be substantially no variance or decrease in the efficiency at which light is incident from the LEDs 3a to the light guide plate 2, or variance or reduction in the amount of light emitted from the front face of the light guide plate 2. Therefore, variance and decrease in the brightness of the display face of the liquid crystal panel 7 can be kept to a minimum. Since design can be based on ensuring the designed amount of light, it will be possible to reduce the number of LEDs 3a, reduce the number of laminations of the optical sheets 6, and so on, all of which contributes to a lower cost.

With the liquid crystal module, the cushioning materials 5 are employed as a means for biasing the light guide plate 2 toward the LED bar 3. However, this is not the only option. The light guide plate 2 can be biased, for example, with a plurality of plastic springs 51 (e.g., tab portion) shown in FIG. 4 (only one is shown in FIG. 4), or with a plurality of sheet metal springs 52 shown in FIG. 5 (only one is shown in FIG. 5).

Figure 4:
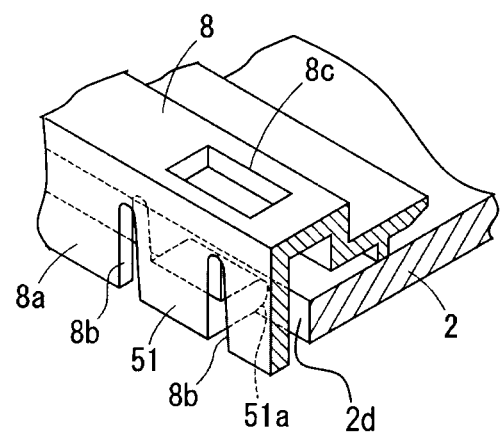
FIG. 4 is an enlarged partial perspective view of a modified biasing means of the liquid crystal module illustrated in FIG. 1.

The plastic spring 51 shown in FIG. 4 is the product of making notches 8b in an outer plate 8a (e.g., side plate) of the molding frame 8 to form the plastic spring 51 therebetween, and integrally molding a protruding part 51.a that presses against the upper end face 2d of the light guide plate 2, on the inner face of this plastic spring 51. The outer plate 8a of the molding frame 8 faces with the upper end face 2d of the light guide plate 2. The plastic spring 51 is integrally formed on the outer plate 8a. The protruding part 51a of the plastic spring 51 protrudes toward the upper end face 2d of the light guide plate 2 relative to the outer plate 8a of the molding frame 8 such that the plastic spring 51 biases the upper end face 2d of the light guide plate 2 toward the LED bar 3. In this case, the molding frame 8 further has a hole 8c for removing a mold for the molding frame 8.

Figure 5:
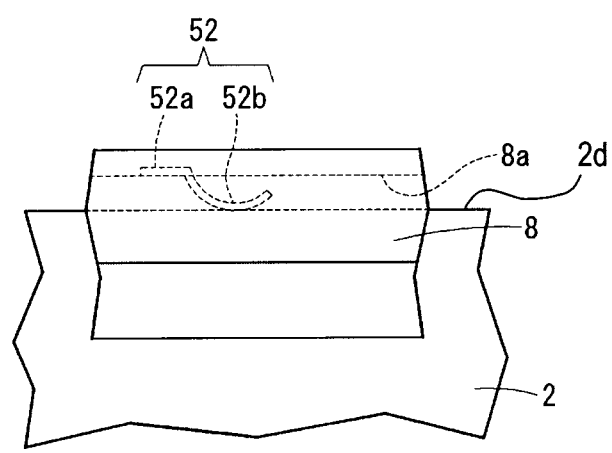
FIG. 5 is an enlarged partial front elevational view of another modified biasing means of the liquid crystal module illustrated in FIG. 1.

The sheet metal spring 52 shown in FIG. 5 is the product of embedding a proximal part 52a in the inner face of the outer plate 8a of the molding frame 8, and biasing the upper end face 2d of the light guide plate 2 with a curved part 52b (e.g., head part) extending from the proximal part 52a. More specifically, the sheet metal spring 52 is fixedly mounted to the outer plate 8a of the molding frame 8. The curved part 52b of the sheet metal spring 52 protrudes toward the upper end face 2d of the light guide plate 2 relative to the outer plate 8a of the molded frame 8 such that the sheet metal spring 52 biases the upper end face 2d of the light guide plate 2 toward the LED bar 3.

The liquid crystal module is not limited to the above-mentioned liquid crystal module, and various design modifications are permitted. For instance, the LED bar 3 can be disposed along either the upper end face 2d, the left end face, or the right end face of the light guide plate 2. The protruding components 2c can be molded integrally with either the upper end face 2d, the left end face, or the right end face of the light guide plate 2. With this arrangement, the distal end faces of the protruding components 2c can be abutted with the wiring board 3b of the LED bar 3. Furthermore, the liquid crystal module can include different type of light source unit from the LED bar 3. In this case, the light source unit can include different type of light source elements from the LEDs 3a, such as cold cathodes and so forth.

With the liquid crystal module, a liquid crystal module with which variance is reduced in the clearance C between the one end face (e.g., lower end face 2b) of the light guide plate 2 and LEDs 3a, thereby making it possible to enhance precision, decrease the brightness variance width of the liquid crystal panel display face, reduce the number of LEDs 3a, vary the optical sheet configuration, and so forth, all without increasing the number of parts or assembly steps.

With the liquid crystal module, the light guide plate 2 is provided in the interior of the rear frame 1. The LED bar 3 has LEDs 3a arranged in a row on the wiring board 3b, and is provided along the lower end face 2h of the light guide plate 2 so that the clearance C is maintained between the lower end face 2b of the light guide plate 2 and the LEDs 3a. The liquid crystal panel 7 is disposed on the front face side of the light guide plate 2 with the optical sheet 6 in between. The protruding components 2c with the equal protrusion height A are molded integrally with the lower end face 2b of the light guide plate 2 and are spaced apart. The distal end face of each of the protruding components 2c abuts the wiring board 3b of the LED bar 3.

With the liquid crystal module, it is preferable if the upper end face 2d of the light guide plate 2 is biased toward the LED bar 3 by the biasing means. The distal end faces of the protruding components 2c formed at the lower end face 2h of the light guide plate 2 are pressed against the wiring board 3b of the LED bar 3. This biasing means can be the plastic spring 51, the sheet metal spring 52, or the cushioning material 5.

With the liquid crystal module, the protruding components 2c of the equal protrusion height A are integrally molded so as to be spaced apart on the lower end face 2b of the light guide plate 2. The distal end faces of the protruding components 2c are abutted with the wiring board 3b of the LED bar 3. The gap between the wiring board 3b of the LED bar 3 and the lower end face 2b of the light guide plate 2 can be precisely maintained at the protrusion height A of the protruding components 2c. Thus, the clearance C between the LEDs 3a and the lower end face 2b of the light guide plate 2 can be precisely maintained at the design value, obtained by subtracting the height H of the LEDs 3a from the protrusion height A of the protruding components 2c. Therefore, there will be substantially no variance or decrease in the efficiency at which light is incident from the LEDs 3a to the light guide plate 2, or variance or reduction in the amount of light emitted from the front face of the light guide plate 2. Thus, variance and decrease in the brightness of the liquid crystal panel display face can be kept to a minimum. Since design can be based on ensuring the designed amount of light, it will be possible to reduce the number of LEDs 3a, vary the optical sheet configuration (such as reducing the number of laminated prism sheets), and so on. Also, since the protruding components 2c are integrally molded at the lower end face 2b of the light guide plate 2, there is no increase in the number of parts or assembly steps. Because it is possible to reduce the number of LEDs 3a and to vary the optical sheet configuration as mentioned above, the liquid crystal module can be produced at lower cost.

Also, with the liquid crystal module, the upper end face 2d of the light guide plate 2 is biased toward the LED bar 3 by the biasing means. The distal end faces of the protruding components 2c formed at the lower end face 2b of the light guide plate 2 are pressed against the wiring board 3b of the LED bar 3. The distal end faces of the protruding components 2c will not move away from the wiring board 3b of the LED bar 3 even when subjected to vibration, etc. The clearance C between the LEDs 3a and the lower end face 2b of the light guide plate 2 can be precisely maintained at a value obtained by subtracting the height H of the LEDs 3a from the protrusion height A of the protruding components 2c. Thus, the effect of suppressing a decrease or variance in the brightness of the liquid crystal panel display face is even more pronounced.

The liquid crystal module can be incorporated into a television set, a personal computer, or another such electronic device. With the liquid crystal module, the precision of the clearance C between LEDs 3a and the lower end face 2b of the light guide plate 2 is enhanced, which makes it possible to decrease the brightness variance width, reduce the number of LEDs 3a, vary the optical sheet configuration, and so forth.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A liquid crystal module comprising:
a rear frame;
a light guide plate disposed in an interior of the rear frame, the light guide plate having a plurality of protruding components on a first end face of the light guide plate, the protruding components being spaced apart from each other in a first direction of the light guide plate and having distal end faces;
a light source unit disposed along the first end face of the light guide plate, the light source unit having a wiring board and a plurality of light source elements that are disposed on the wiring board, the distal end faces of the protruding components abutting the wiring board of the light source unit, respectively, such that the first end face of the light guide plate and each of the light source elements defines a spacing therebetween;
a biasing member biasing a second end face of the light guide plate toward the light source unit such that the distal end faces of the protruding components are pressed against the wiring board of the light source unit, respectively, with the second end face of the light guide plate being opposite the first end face of the light guide plate; and
a molded frame provided around the rear frame, the molded frame having a side plate that faces the second end face of the light guide plate,
the rear frame having drawn components on left and right side plates of the rear frame, respectively, the drawn components inwardly protruding towards left and right flat side faces of the light guide plate, respectively, to position the light guide plate in the first direction, the drawn components of the rear frame and the left and right flat side faces of the light guide plate define gaps therebetween, respectively,
the biasing member including a tab portion with a protruding part, the tab portion being integrally formed on the side plate of the molded frame, the protruding part of the tab portion protruding toward the second end face of the light guide plate relative to the side plate of the molded frame such that the tab portion biases the second end face of the light guide plate toward the light source unit,
the molded frame further having a hole adjacent to the tab portion.

2. The liquid crystal module according to claim 1, further comprising
a liquid crystal panel disposed forward of the liquid crystal module relative to the light guide plate, and
an optical sheet disposed between the light guide plate and the liquid crystal panel.

3. The liquid crystal module according to claim 1, wherein the light source elements are arranged in a row along the wiring board.

4. The liquid crystal module according to claim 1, wherein the protruding components have an equal height measured between the first end face of the light guide plate and the distal end faces of the protruding components, respectively, in a second direction of the light guide plate that is perpendicular to the first direction of the light guide plate.

5. The liquid crystal module according to claim 1, wherein the light guide plate is integrally formed as a one-piece, unitary member.

6. The liquid crystal module according to claim 1, wherein at least one of the light source elements is disposed within a recess defined between a pair of adjacent protruding components of the protruding components in the first direction of the light guide plate.

7. The liquid crystal module according to claim 1, wherein the protruding components are equidistantly arranged along the first end face of the light guide plate.

8. The liquid crystal module according to claim 1, wherein one of the protruding components abuts the wiring board of the light source unit at a location between a pair of adjacent light source elements of the light source elements of the light source unit.

9. The liquid crystal module according to claim 1, wherein each of the spacings has an equal dimension measured in a second direction of the light guide plate that is perpendicular to the first direction of the light guide plate.

10. The liquid crystal module according to claim 1, wherein
adjacent pairs of the protruding components of the light guide plate and the light source elements of the light source unit define lateral spacings therebetween in the first direction, respectively, the lateral spacings having a dimension in the first direction that is larger than a dimension of the gaps in the first direction.

11. The liquid crystal module according to claim 1, wherein
the light guide plate is mirror-symmetrically formed with respect to a horizontal center plane that is perpendicular to the first direction of the light guide plate and extends through one of the protruding components of the light guide plate.

12. The liquid crystal module according to claim 1, wherein
a plurality of additional biasing members are provided with the liquid crystal module.

13. The liquid crystal module according to claim 12, wherein
the biasing member and the additional biasing members are located at a horizontal center of the second end face of the light guide plate, and at equidistantly and oppositely spaced locations relative to the horizontal center.

14. The liquid crystal module according to claim 13, wherein
one of the protruding components of the light guide plate is aligned to one of the biasing member and the additional biasing members that is located at the horizontal center of the second end face of the light guide plate as viewed in a direction perpendicular to the first direction.

* * * * *